INVENTORS
SADATOMO KURIBAYASHI
EISEI TAYAMA
MAKIO MISHIMA
SYUICHI YUZAWA
BY
ATTORNEYS

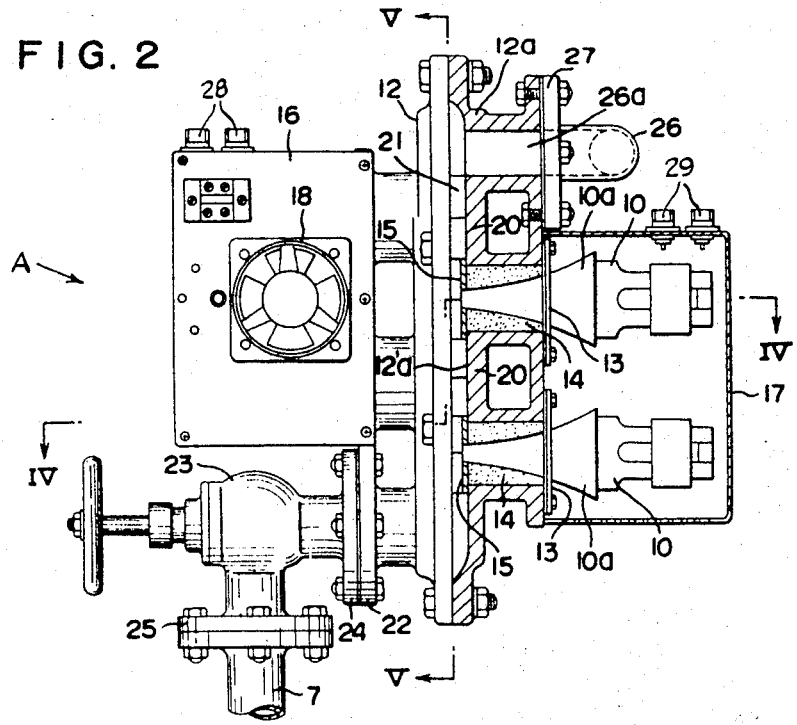
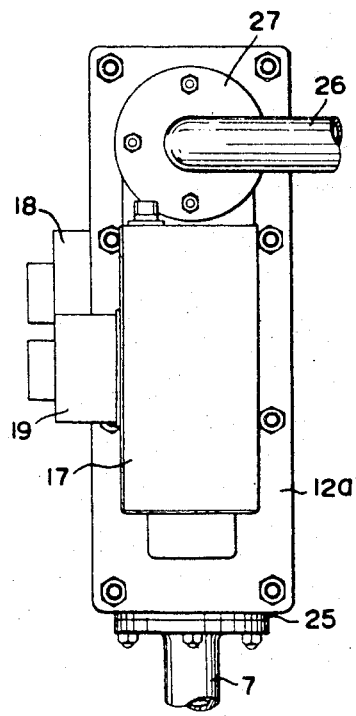

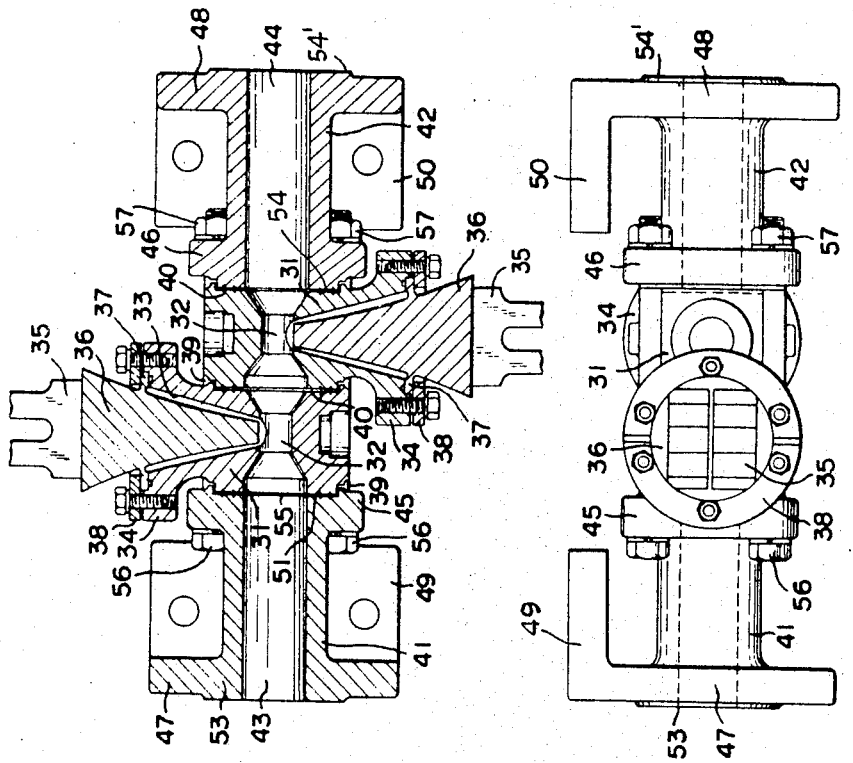

United States Patent Office 3,451,379
Patented June 24, 1969

3,451,379
METHOD AND APPARATUS FOR TREATING LIQUID FUEL OIL
Sadatomo Kuribayashi, Eisei Tayama, Makio Mishima, and Syuichi Yuzawa, Tokyo, Japan, assignors to Coal Research Institute, Kawasaki-shi-Kanagawa, Japan, a Japanese Institute and Kay Seven Co., Ltd., Tokyo, Japan, a Japanese body corporate
Filed July 26, 1966, Ser. No. 567,970
Int. Cl. F02m 27/08; F02b 51/06; B01f 11/02
U.S. Cl. 123—1    19 Claims

ABSTRACT OF THE DISCLOSURE

A method and apparatus for continuously processing liquid fuel oil wherein the oil, which completely fills and flows continuously through a liquid conveying pipe-line in a combustion chamber feeding flow circuit, is subjected to ultrasonic waves in a flow duct in said pipe-line. The flow duct has at least one restricted tubular portion, one inner side wall portion of which is operatively connected to or accommodates at least the forward free end of the horn member of an ultrasound generating vibrator appliance extending transversely of and directed towards said duct.

---

The present invention relates to a method and apparatus for treating liquid fuel oil.

As the internal and external combustion engines have become widely used in the industrial field, the research has been directed to the improvement of fuel in order to improve the performance of the engines and promote the economy. Recently, it has been proposed to irradiate the liquid fuel oil with ultrasonic waves thereby finely dividing and dispersing the impurities contained therein.

In general, when it is desired to irradiate a liquid with ultrasonic waves, it has been the practice to apply the ultrasonic wave to the liquid which is contained in a treating tank without causing movement of the liquid. In such ultrasonic irradiation there is much trouble in charging and discharging the liquid into and out of the treating tank and, what is more important, it is difficult to apply the ultrasonic wave uniformly throughout the mass of liquid contained in the tank. Thus, although the ultrasonic irradiation of liquid fuel oil has been proposed, it could not be put into practice up to now.

Accordingly it is a general object of the present invention to provide a method and apparatus for treating liquid fuel oil whereby an ultrasonic wave is effectively and uniformly applied to such a liquid fuel oil as mentioned above to improve the combustion efficiency and to minimize the adverse effects of the impurities contained therein upon the engines, and the liquid fuel oil of a lower grade than that of oils heretofore used can be satisfactorily used to obtain the same or a better combustion effect and to minimize the adverse effects of the impurities.

Heavy oil commonly used in an internal combustion engine, particularly in a Diesel engine, is classified according to its quality in two or three grades which are substantially different in cost. An internal combustion engine, particularly a Diesel engine, is usually so designed as to employ the highest grade of heavy oil, but if only the highest grade of heavy oil is employed in a marine engine or the like of low speed and high power type, the cost for the fuel is much increased. Under circumstances, the lower grade of heavy oil is sometimes employed by improving the method of combustion. However, the lowest grade of heavy oil has high viscosity and contains a high percentage of impurities, so that if the lowest grade is used in a Diesel engine, the combustion efficiency is low and the cylinders of the engine are adversely affected.

Accordingly it is a particular object of the present invention to provide a method and apparatus for treating heavy oil in which an ultrasonic wave is applied to the heavy oil of lower grade, particularly of the lowest grade, thereby improving its quality so that the same or a better combustion effect as or than that of the higher grade heavy oil may be obtained and the adverse effects of the impurities contained therein upon the engines may be minimized.

It is another object of the present invention to provide a method and apparatus for treating liquid fuel oil by applying an ultrasonic wave to the liquid fuel oil effectively and uniformly while the liquid is flowing.

It is a further object of the present invention to provide a method and apparatus for treating liquid fuel oil in which the liquid fuel oil is irradiated with an ultrasonic wave while it is being fed to an internal or external combustion engine.

It is a further object of the present invention to provide a method and apparatus for treating heavy oil of lower grade in which the heavy oil is irradiated with an ultrasonic wave while it is being fed to an internal or external combustion engine.

In accordance with an aspect of the present invention there are provided a method and apparatus for treating liquid fuel oil in which the liquid fuel oil is irradiated with an ultrasonic wave at a convenient point on the line for feeding the oil to a combustion point of the engine.

In accordance with another aspect of the present invention, there are provided a method and apparatus for treating heavy oil in which the heavy oil is irradiated with an ultrasonic wave at a convenient point on the line for feeding the heavy oil from a supply tank through pressurizing and heating zones to a nozzle or a burner of an engine.

Further, in accordance with another aspect of the invention, there are provided a method and apparatus for treating liquid fuel oil in which the liquid is passed between opposed flat faces of a tubular path while an ultrasonic wave is applied alternatively from one of the flat faces and the other to the liquid flowing therebetween.

In accordance with a further aspect of the present invention, there is provided an apparatus for treating liquid fuel oil which comprises mounting members having a passage therethrough, vibrators transversely mounted in said members so as to project in the passage, both sides of said members or two or more of said members being in communication through passages, both sides of which are connected to a liquid conveying tube.

Now the invention will be described in detail with reference to the accompanying drawings which illustrate some preferred embodiments of the invention and in which:

FIGURE 2 is an elevation showing the ultrasonic treating apparatus constituting the essential part of the invention, the right hand half being shown in section;

FIGURE 3 is a side elevation of the same;

FIGURE 5 is a section along line V—V in FIGURE 2;

FIGURE 6 is a longitudinal section showing another embodiment of the ultrasonic treating apparatus according to the invention;

FIGURE 7 is a plan view of the same;

Figure 1:
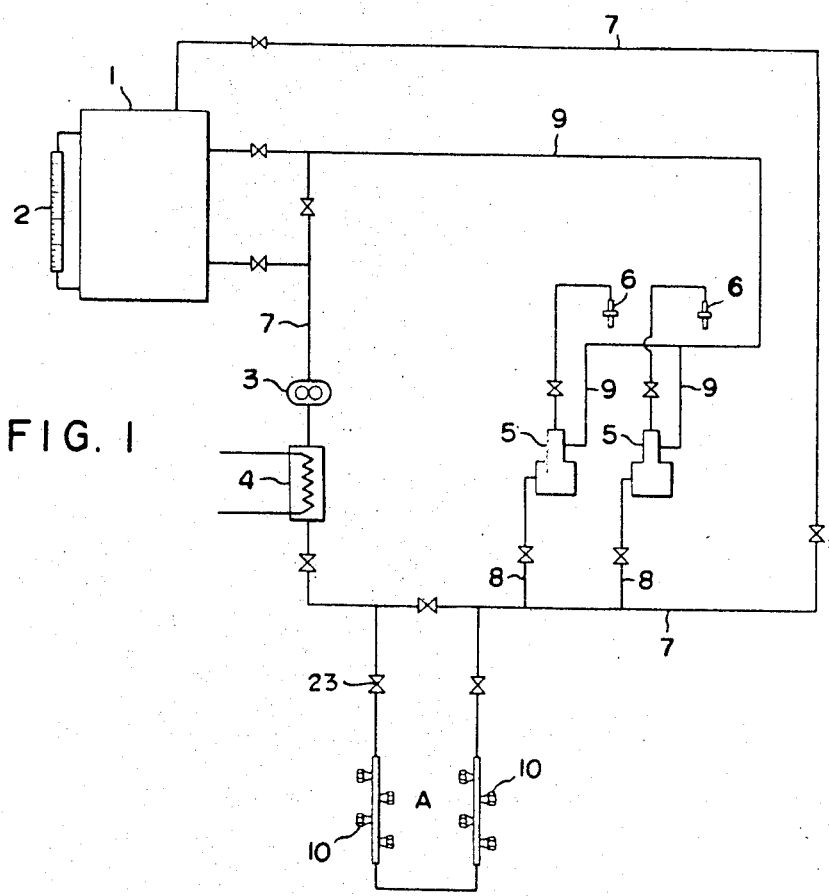
FIGURE 1 is a schematic diagram showing a heavy oil feeding system of a marine Diesel engine embodying the present invention.
Figure 4:
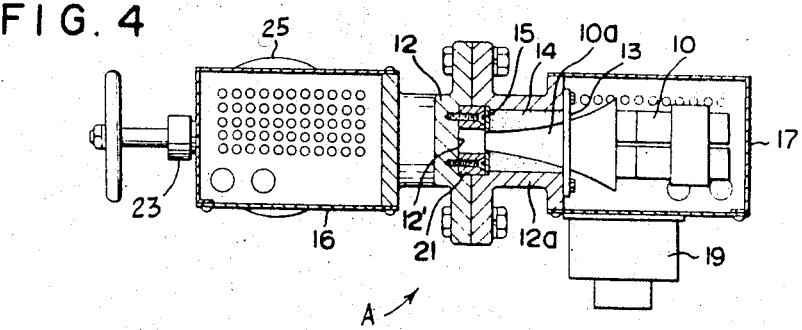
FIGURE 4 is a section along line IV—IV in FIGURE 2.

Referring to the drawings, FIGURE 1 illustrates an example of a heavy oil feeding system for a marine Diesel engine embodying the present invention. The system shown in FIGURE 1 comprises a supply tank 1 of heavy oil, a thermometer 2, a booster pump 3, a heater 4, jet pumps 5 having a nozzle 6, a circulating pipe 7 for circulating the heavy oil from the supply tank 1 through the booster pump 3 and heater 4 back to the supply tank 1, feeding pipes 8 for feeding the heavy oil from the pipe 7 to the jet pumps 5, a circulating pipe 9 for circulating the heavy oil, which has been fed to the jet pump 5 but has not been supplied to the nozzle 6, back to the supply tank 1 or the pipe 7. An ultrasonic treating apparatus A having vibrators 10 is disposed along the pipe 7 between the heater 4 and the pipe 8. The heavy oil delivered from the supply tank 1 passes through the pipe 7, and is pressurized by the booster pump 3 and heated by the heater 4. Then the heavy oil passes through the ultrasonic treating apparatus A where the oil is irradiated with at least one ultrasonic wave, and then a part of the oil passes through the pipe 8 to the jet pump 5, while the other part passes through the pipe 7 and is returned to the supply tank. A part of the heavy oil fed to the jet pump 5 passes to the nozzle 6 from which it is ejected into the engine, while the other part passes through the pipe 9 to the supply tank 1 or to the pipe 7. The heavy oil passing through the pipe 7 is subjected to the effect of the ultrasonic wave at the apparatus A, which serves to violently stir the heavy oil and disperse the substances contained therein uniformly and at the same time serves to cut off the intermolecular bonds to produce the hydrocarbon of lower molecular weight. Furthermore, the vibration of the ultrasonic wave serves to cause the electric potential at surface to go up by the friction between the molecules of the hydrocarbon, thus producing ionization, while it serves to finely divide the impurities contained therein and to decrease the viscosity of the heavy oil as a whole, whereby the combustion effect is improved. The booster pump 3 and the heater 4 are used as desired to pressurize and heat the heavy oil. The purpose of the heating step is to render the fuel oil more fluid so as to facilitate its passage through the supply pipe lines and the ultrasonic treating devices.

FIGURES 2 to 5 illustrate one form of the ultrasonic wave treating apparatus A. Referring to the drawings, the apparatus A comprises a pair of mounting members 12 and 12a for mounting the vibrators 10, which cooperate to define a passage, for example of square cross-section, having flat faces 12' and 12'a. Two vibrators 10 are mounted in each of the mounting members and these vibrators are alternately disposed in the mounting members 12 and 12a at a constant distance along the passage so that the ultrasonic waves are alternately directed from one member 12 or 12a to the other 12a or 12. The vibrator 10 consists of a horn 10a formed with a mounting flange 13, which is mounted on the mounting member, and a packing 14 fills up the space between the horn 10a and the mounting member 12, 12a to prevent the liquid fuel from leaking therebetween. The front side of the packing 14 is supported by a plate 15. Vibrator covers 16 and 17 are fixed to the mounting members 12, 12a and cooling fans 18, 19 are attached to said covers. Reflectors 20 are so disposed on the mounting members 12, 12a that each reflector confronts the forward end of the horn of each vibrator 10 and reflects the ultrasonic wave received from the latter. Restricting plates 21 having triangular cross section and fixed on the mounting members 12, 12a serve to restrict the passage formed by the members 12 and 12a at the position where the ultrasonic wave is applied to the liquid passing therethrough and to produce turbulent flow in the liquid which has passed through the restricting plates. The mounting member 12 has a connecting flange 22 at the entrance opening 22a, which is connected with a flange 24 of a valve 23, which has another flange 25 which is connected with the pipe 7. A pipe 26 is connected to the ultrasonic treating apparatus A, by means of its flange 27 fixed to the member 12a and is adapted to feed the treated fuel oil from an outlet 26a of the member 12a to a next ultrasonic treating apparatus or the pipe 7. Terminals 28, 29 are attached to the covers 16, 17. In the form as described above, the passage formed between the mounting members has a rectangular shape in cross section, but it may be of curved shape provided that the confronting flat faces 12' and 12'a must be formed. In the drawings, the restricting plates 21 are disposed at both sides of the passage in confronting relationship in order to uniformly irradiate the fuel oil with ultrasonic waves, but these restricting plates may be arranged at both sides of the passage in an offset relationship so as to form a zigzag path therebetween.

The present invention takes advantage of the properties of ultrasonic waves, that is a stirring and dispersing action and a cutting action. When the liquid fuel oil such as heavy oil, gasoline, kerosene, light oil or the like is subjected to the action of an ultrasonic wave having proper power and frequency, the liquid is stirred and the components contained therein are uniformly dispersed. Furthermore the bond between the molecules of the component having relatively high molecular weight is cut off to produce hydrocarbon of lower molecular weight, and the hydrocarbon causes the rise of electric potential at surface by the friction between the molecules owing to the ultrasonic vibration, that is, produces ionization, while the impurities contained in the fuel oil are stirred and divided into fine particles and decrease the viscosity of the oil as a whole, thereby improving the combustion effect, decreasing the amount of consumption and minimizing the adverse effects of the impurities on the engine. Where methanol, water, a supporter of combustion or the like is added to the oil, this additive is uniformly dispersed in the fuel by the action of the ultrasonic wave to produce a kind of emulsion, thus improving the combustion effect. In the present invention, the liquid fuel oil is effectively and uniformly irradiated with an ultrasonic wave while passing through the circulating line at a suitable point between the supply tank and the burning zone of the engine, whereby the combustion effect is much improved, the amount of consumption is decreased and the adverse effects of the impurities are considerably decreased, resulting in the economy of cost for fuel and decreasing the trouble required for maintenance, repair and exchange of parts of an engine. In accordance with the present invention, the heavy oil of lowest grade can be improved to obtain the combustion effect which is similar or superior to that of the highest grade heavy oil. The test made by the inventors shows that when the heavy oil of lowest grade having a specific gravity of 0.593 (15.5° C.), a viscosity RW at 50° C. of about 574 sec. and including impurities of 150–258$\mu$, is irradiated with an ultrasonic wave of 300 va. and 27 kHz. by the apparatus as described above at a flow rate of 600–1200 ml./min., the impurities are divided into fine particles of 10–20$\mu$.

The ultrasonic treating apparatus according to the present invention is adapted to pass the liquid fuel oil through the tubular path formed with confronting flat faces and to apply the ultrasonic wave to said flowing liquid alternately from the flat face of one side to the flat face of the other side, thus effectively and uniformly irradiating the liquid with an ultrasonic wave, and where the restricting plates are provided, the liquid is propelled through the pasage while creating violent turbulent flow, thus increasing the action of the ultrasonic effect. When the passage is formed by connecting two vibrator mounting members, the passage can be easily and safely repaired and serviced by separating the two members.

FIGURES 6 to 9 illustrate other embodiments of the ultrasonic treating apparatus according to the present invention. Referring to FIGURES 6 and 7, the vibrator mounting member 31 has a passage 32 therein and a vibrator supporting opening 33, into which a horn 36 of a vibrator 35 is inserted so as to project into said passage 32 at the forward end and is fixed thereto by applying its flange 37 against a flange 34 of said mounting member and fastening a fixing plate 38 which is bolted thereto.

The member 31 has a projecting wall 39 at one side and a recessed wall 40 at the other side, which are adapted to cooperate with each other when a plurality of members are connected together. The passage 32 is so formed that the liquid flowing therethrough is restricted at the zone where it is subjected to the ultrasonic wave and its sectional shape may be circular or rectangular or the like. Connectors 41 and 42 for connecting with the conveying pipes have passages 43 and 44 connecting with the passages 32 and the passages of the conveying pipes, flanges 45 and 46 connected to the vibrator mounting members, streams, where it is subjected to the action of the ultrasonic wave from the horns. Then the liquid passes to the other conveying pipe.

In the forms shown in FIGURES 6 to 9, the mounting member may be constructed as a short integral part, to which one or more vibrators can be mounted, so that the desired number of mounting members may be connected together according to the kind and quality of the liquid to be treated. Furthermore these constructions can be easily and economically manufacured.

We have made tests on an experimental ship equipped with the apparatus according to the present invention in the case where the intermediate grade of heavy oil is used without irradiation by an ultrasonic wave and in the case where the lowest grade of heavy oil is used with irradiation by an ultrasonic wave. The result is shown in the following table.

TABLE

|  | Intermediate grade of heavy oil without ultrasonic wave | Lowest grade of heavy oil with ultrasonic wave | Comparison |
|---|---|---|---|
| Test period | 1,964.10.7–1,965.4.5 | 1,965.10.7–1,966.3.30 | |
| Running distance | 2,3384.7 sea miles | 19,881.6 sea miles | |
| Running time | 1,952 h. 45 mn | 1,616 h. 45 mn | |
| Do | 81.36 days | 67.37 days | |
| Steaming time | 1,918 h. 24 mn | 1,586 h. 18 mn | |
| Do | 79.93 days | 66.10 days | |
| Average speed | 12.19 kt | 12.53 kt | 0.34 kt. increase. |
| Average draught | 4.46 m | 4.59 m | 0.13 m. increase. |
| Consumption fuel | B Heavy Oil _____ A Heavy Oil _____ 724.694 kl _____ 3.274 kl | C Heavy Oil _____ A Heavy Oil _____ 565.669 kl _____ 11.655 kl | |
| Fuel consumption rate | Total 727.968 kl  8,947.5 l./day  8,179.2 kg./day  31.130 l./sea mile  28.500 kg./sea mile | Total 577.324 kl.  8,569.4 l./day  8,122.6 kg./day  29.030 l./sea mile  27.524 kg./sea mile | 378.1 l. (4.23%) decrease.  56.6 kg. (0.69%) decrease.  2.092 l. (6.72%) decrease.  0.976 kg. (3.42%) decrease. |
| Fuel index [1] | (l./day) 53.976  (kg./day) 59.050 | 62 191 l./day  65.606 kg./day | 17.7% good.  11.1% good. |

[1] Fuel index: $K = \dfrac{V^3 \times \Delta^{2/3}}{C}$ v=Speed knot/hr. Δ=Displacement. C=F.O. consumption.

flanges 47 and 48 adapted to connect with the conveying pipes and walls 49 and 50. The flange 45 is formed with a recess 51 for fitting with the projecting wall 39 and the flange 46 is formed with a projecting wall 54 for fitting with the recess 40. The flanges 47 and 48 have projecting walls 53 and 54' engaging the flanges of the conveying pipes. The flange 45, the vibrator mounting member 31 and the flange 46 are fastened together by a bolt 56 and a nut 57, with packings 55' being interposed between the parts. When two members 31 are connected, these are arranged at 180° with respect to each other, as shown in FIGURE 6 and when more than two members are connected, they are arranged at 180° alternately.

Assuming that the liquid flows from left to right in FIGURES 6 and 7, the liquid fuel oil fed to the passage 32 through the passage 43 is restricted at the end of the horn 36 where it is subjected to the action of the ultrasonic wave, and then the liquid is expanded to produce turbulent flow therein. The liquid is again restricted where it is subjected to the action of the ultrasonic wave and then expanded again to further produce turbulent flow and it passes to the conveying pipe.

Figure 8:
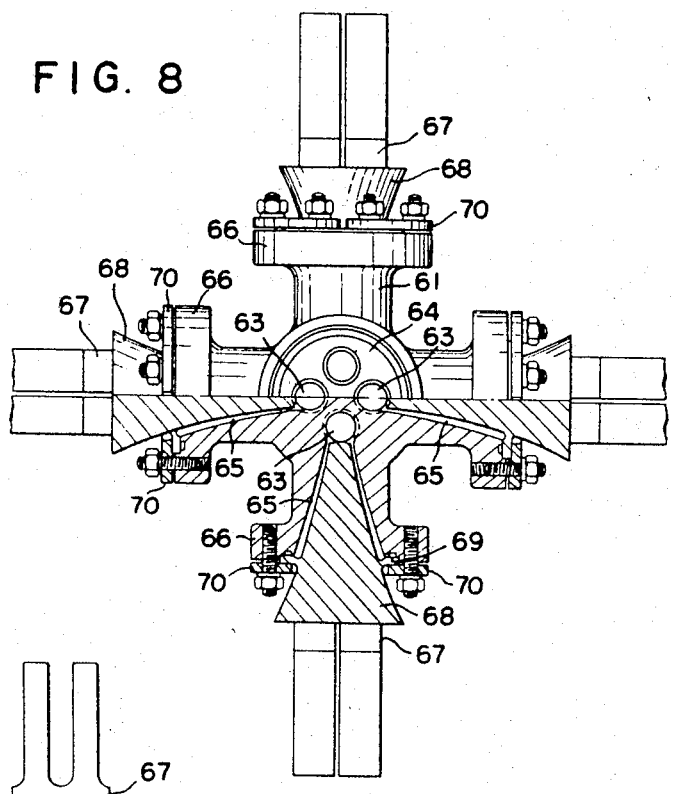
FIGURE 8 is a side elevation showing another form of the ultrasonic treating apparatus, the lower half being in section.
Figure 9:
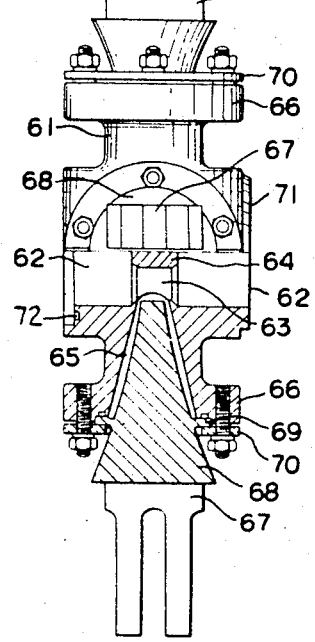
FIGURE 9 is a front elevation of the same, the lower half being in section.

FIGURES 8 and 9 illustrate another embodiment. In this form, a vibrator mounting member 61 formed with a flange 66 has a passage 62, in which a plate 64 having four small holes 63 is provided. Vibrator mounting holes 65 are formed in the member 61 at right angles to the passage 62 and vibrators 67 having horns 68 formed with respective collars 69 are inserted in the holes so as to project into the pasage and fixed with said collars to said flanges 66 by fastening plates 70 by means of bolts. The member 61 has a projecting wall 71 at one side and a recess 72 at the other side, by means of which the member 61 can be connected to another mounting member or the conveying pipe. The liquid fed by one of the conveying pipes is restricted at the plate 64 and divided into four

What we claim is:

1. A method for treating liquid fuel oil in the substantial absence of any gaseous fluid comprising the steps of continuously circulating the liquid fuel oil from at least one supply source through at least one circulating line entirely filled with said liquid and feeding at least one combustion zone of at least one engine and applying at least one ultrasonic wave to said liquid at at least one intermediate point of and across each circulating line extending from any supply source to any combustion zone.

2. A method for treating heavy liquid oil in the substantial absence of any gaseous fluid comprising continuously circulating the heavy oil from at least one supply tank through at least one circulating line entirely filled with said liquid oil, including successively at least one pressurizing zone and at least one heating zone for the heavy oil, and nozzle means for at least one combustion chamber of at least one engine, and applying at least one ultrasonic wave to the heavy oil at at least one intermediate point of and across each circulating line extending from any supply tank to the nozzle means, between the latter and said heating zone.

3. A method for treating liquid fuel oil in the substantial absence of any gaseous fluid, comprising continusuoly circulating the liquid fuel oil from at least one supply source through at least one circulating tubular passage entirely filled with said liquid and having opposed substantially flat parallel side wall faces to at least one combustion zone of at least one engine and emitting at least one ultrasonic wave from at least one of the flat faces towards the opposite one to apply the ultrasonic wave to and across the liquid flowing therethrough.

4. A method for treating liquid fuel oil in the substantial absence of any gaseous fluid comprising continuously circulating the liquid fuel oil from at least one supply source through at least one circulating tubular passage entirely filled with said liquid and having opposed substantially flat parallel faces and at least one restricting plate therebetween to at least one combustion zone of at least one engine, and emitting at least one ultrasonic wave alternately from at least one of the flat faces towards the opposed other one to apply the ultrasonic wave transversely to the restricted flow of the liquid.

5. An apparatus for treating liquid fuel oil in the substantial absence of any gaseous fluid, comprising at least one supply source of liquid fuel oil, at least one combustion zone of at least one engine, at least one circulating line entirely filled with said liquid for circulating the liquid from any supply source to any combustion zone, and ultrasonic wave applying means disposed in and across each line between any supply source and any combustion zone.

6. An apparatus according to claim 5, comprising at least one tubular passage in and intermediate of each line, having opposed substantially flat parallel faces for circulating said liquid fuel oil therethrough, and a plurality of vibrators forming said ultrasonic wave applying means alternately arranged in the flat faces of the tubular passage transversely to the liquid flowing therethrough.

7. An apparatus according to claim 6, further comprising restricting plate means in each one of said passages to define a restricted passage-way at the location of any ultrasonic wave applying means.

8. An apparatus according to claim 5, comprising at least two vibrator mounting members arranged to form at least one tubular passage having opposed substantially flat parallel faces therein and at least one vibrator fixed in each of said mounting members transversely to one flat face.

9. An apparatus according to claim 8, further comprising restricting plate means disposed in each passage to define a restricted passage-way at the location of any vibrator.

10. An apparatus according to claim 5, comprising at least one tubular passage forming vibrator mounting member means and vibrator means fixed on said member transversely to the passage so as to project into said passage, said vibrator mounting member means being connected at their inlet and outlet sides to liquid conveying pipes forming an intermediate portion of said circulating line.

11. An apparatus according to claim 10, comprising restricting plate means disposed in said passage to define a restricted passage-way at the location of any vibrator.

12. An apparatus according to claim 10, comprising a plurality of vibrator mounting members connected together in series.

13. An apparatus for treating liquid heavy oil in the substantial absence of any gaseous fluid, comprising at least one supply source of heavy oil, nozzle means for at least one combustion chamber of at least one engine, at least one circulating line entirely filled with and for circulating the heavy oil from any supply source to the nozzle means, pressurizing and heating means arranged in each line for pressurizing and heating the heavy oil continuously flowing therethrough and ultrasonic wave applying means disposed in each line between said heating means and said nozzle means.

14. A circuit system for feeding liquid fuel oil to injection nozzle means fitting combustion chamber means of a fuel burning engine or machine from a fuel storage tank by means of a fuel supply line through fuel pressurizing booster pump means, and injection pump means, wherein the improvement consists in the provision of at least one fuel treating ultrasonic device, connected in series into said supply line between said booster pump means and the suction line means of said injection pump means feeding said injection nozzle means.

15. A circuit system according to claim 14, comprising fuel heating means inserted in said fuel supply line between said booster pump means and the most upstream located ultrasonic device.

16. A circuit system according to claim 14, comprising a first excess fuel return line branched off from between the outlet of the most downstream-lying ultrasonic device and said suction line means, and connected to said tank, and a second excess fuel return line branched away from the discharge heads of said injection pump means and connected to the booster pump means suction line portion of said supply line.

17. A circuit arrangement for directly feeding liquid fuel oil to fuel injection means fitting combustion chamber means of an oil burning engine by means of a fuel supply line comprising fuel injection pump means, wherein the improvement consists in the provision of at least one apparatus for treating said liquid fuel oil, comprising a plurality of ultrasonic vibrator heads disposed on said fuel supply line, upstream of said injection pump means and including each one a pair of elongated complementary casing members defining a flat narrow liquid fuel oil passage therebetween when assembled together and fitted with a plurality of said vibrator heads which are equally spaced, project endwise into said passage and are mounted alternately on opposite sides of said casing members assembled together so as to apply ultrasonic waves to said liquid fuel oil flowing through said passage, alternately from both flat sides thereof; a plurality of reflectors located each one opposite to each vibrator head so as to reflect the ultrasonic waves directed thereto from the vibrator head across said passage; and a plurality of baffle plates disposed on opposite sides of said flat liquid fuel oil passage and formed with a number of irregular deflecting surfaces so as to produce a turbulent flow in the liquid stream being subjected to the ultrasonic treatment.

18. A circuit arrangement according to claim 17, wherein the liquid flow passage defined by said casing members converges towards each vibrator head axes extending transversely to said passage and then diverges away from same in the downstream flow direction.

19. A method for treating liquid fuel oil flowing in a liquid fuel oil supply line feeding an oil burning engine through injection pump means inserted in said fuel oil supply line, comprising the steps of providing a substantially flat flow passageway formed by at least one pair of casing members in said liquid fuel oil supply line upstream of said injection pump means; passing said liquid fuel oil through said flat passageway while applying ultrasonic waves repeatedly thereto by means of a plurality of ultrasonic vibrator heads disposed alternately on both opposite sides of said flat passageway and mounted on said casing members, whereby a plurality of beams of ultrasonic waves are directed alternately from both opposite flat sides of said passageway hence alternately in either direction across said liquid flow; reflecting said ultrasonic wave by a plurality of reflectors disposed opposite to said vibrator heads, respectively; and causing a turbulent flow to occur in said liquid fuel oil being subjected to ultrasonic waves, by means of deflecting baffle plates provided in said passageway.

References Cited

UNITED STATES PATENTS

| | | | |
|---|---|---|---|
| 2,375,883 | 5/1945 | Anderson | 123—119 |
| 2,704,535 | 3/1955 | Magui et al. | |
| 2,732,835 | 1/1956 | Hundt. | |
| 2,791,990 | 5/1957 | Grieb. | |
| 2,855,244 | 10/1958 | Camp. | |

AL LAWRENCE SMITH, *Primary Examiner.*

U.S. Cl. X.R.

123—32, 119, 122; 137—13; 259—1, 72